US008838519B2

(12) United States Patent
Hively

(10) Patent No.: US 8,838,519 B2
(45) Date of Patent: Sep. 16, 2014

(54) GRAPH-THEORETIC ANALYSIS OF DISCRETE-PHASE-SPACE STATES FOR CONDITION CHANGE DETECTION AND QUANTIFICATION OF INFORMATION

(71) Applicant: UT-Battelle, LLC, Oak Ridge, TN (US)

(72) Inventor: Lee M. Hively, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 118 days.

(21) Appl. No.: 13/646,081

(22) Filed: Oct. 5, 2012

(65) Prior Publication Data

US 2013/0091086 A1 Apr. 11, 2013

Related U.S. Application Data

(60) Provisional application No. 61/543,950, filed on Oct. 6, 2011.

(51) Int. Cl.

*G06F 17/00* (2006.01)
*G06N 5/02* (2006.01)
*G06N 99/00* (2010.01)

(52) U.S. Cl.

CPC .................................... *G06N 99/005* (2013.01)
USPC ........................................................... 706/50

(58) Field of Classification Search

None
See application file for complete search history.

(56) References Cited

U.S. PATENT DOCUMENTS

| | | | | |
|---|---|---|---|---|
| 5,626,145 | A * | 5/1997 | Clapp et al. | 600/544 |
| 7,849,048 | B2 * | 12/2010 | Langseth et al. | 707/602 |
| 2006/0053133 | A1 * | 3/2006 | Parkinson | 707/101 |
| 2008/0159590 | A1 * | 7/2008 | Yi et al. | 382/103 |

OTHER PUBLICATIONS

An Optimal Graph Theoretic Approach to Data Clustering: Theory and Its Application to Image Segmentation Zhenyu Wu and Richard Leahy IEEE Transactions on Pattern Analysis and Machine Intelligence, vol. 15, No. 11, Nov. 1993.*

* cited by examiner

*Primary Examiner* — Kakali Chaki
*Assistant Examiner* — Luis Sitiriche
(74) *Attorney, Agent, or Firm* — Scully, Scott, Murphy & Presser, P.C.

(57) ABSTRACT

Data collected from devices and human condition may be used to forewarn of critical events such as machine/structural failure or events from brain/heart wave data stroke. By monitoring the data, and determining what values are indicative of a failure forewarning, one can provide adequate notice of the impending failure in order to take preventive measures. This disclosure teaches a computer-based method to convert dynamical numeric data representing physical objects (unstructured data) into discrete-phase-space states, and hence into a graph (structured data) for extraction of condition change.

13 Claims, 2 Drawing Sheets

Receive unstructured, streaming data

Convert data into structured data

Perform Graph-theoretic analysis of the structured data

GRAPH-THEORETIC ANALYSIS OF DISCRETE-PHASE-SPACE STATES FOR CONDITION CHANGE DETECTION AND QUANTIFICATION OF INFORMATION

CROSS REFERENCE TO RELATED APPLICATION

The present invention claims the benefit of U.S. provisional patent application 61/543,950 filed Oct. 6, 2011, the entire contents and disclosure of which are incorporated herein by reference.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The invention relates generally to data analysis and allows conversion of unstructured numeric data (a stream of time-serial numeric data) into structured data (a graph).

BACKGROUND

A substantial body of work in the art of condition change analysis and event forewarning exists. Some exemplary work includes Method and System for Knowledge Discovery using nonlinear statistical analysis and a $1^{st}$ and $2^{nd}$ Tier Computer Program, Methods for Improved Forewarning of Critical Events Across Multiple Data Channels, Methods for Consistent Forewarning of Critical Events Across Multiple Data Channels, Condition Assessment of Nonlinear Processes, Integrated Method for Chaotic Time Series Analysis, Method and Apparatus for Extraction of Low-frequency Artifacts from Brain Waves for Alertness Detection, Methods for Using a Biometric Parameter in the Identification of Persons, and Methods for Improved Forewarning of Condition Changes in Monitoring Physical Processes. In addition, existing work on phase-space reconstruction of numerical data uses recurrence matrices, fractal dimension, geodesic distance, and Granger causality.

BRIEF SUMMARY OF THE DISCLOSURE

Data collected from devices and processes, including devices documenting a human condition, may be used to forewarn of critical events such as machine/structural failure or events from brain/heart wave data. By monitoring the data, and determining data values indicative of a failure forewarning, adequate notice of the impending failure can be provided in order to take preventive measures. The present invention comprises a computer-based method to convert dynamical numeric data (unstructured data) from processes or physical objects into discrete-phase-space states, and hence into a graph (structured data) for extraction of condition change.

The inventive method for condition change detection includes receiving a stream of time-serial numeric data representing a physical object, converting the data into structured data, e.g., a graph, and analyzing the structured data with graph-theoretic analysis to detect condition change in the time-serial numerical data and to quantify changes among phase-space dynamical states of the structured data. In one aspect, the analysis includes computing a Laplacian matrix of the structured data, computing eigenvalues of the Laplacian matrix and using the eigenvalues to detect condition change.

In one aspect, the inventive method can include performing a quality check of the received data in a specific analysis window (cutset). In another aspect of the inventive method, artifacts in the received data are removed with a zero-phase quadratic filter. In another aspect, the inventive method can include symbolizing the artifact-filtered data. In another aspect, the time-delay-embedding theorem is used to define a plurality of phase-space dynamical states. In another aspect, the time-delay-embedding states are represented as nodes in a mathematical graph and the state-to-state dynamical transitions as links in the mathematical graph. In another aspect, graph theorems are used to guarantee topologically-invariant measures of these graphs, namely measures that do not depend on the labeling of the nodes or links, but only on the graph topology. In another aspect, four dissimilarity measures between graphs from different cutsets are used. In another aspect, each dissimilarity measure is normalized to the total number of nodes (links) in A (for A not in B) or (for B not in A). In another aspect, several initial cutsets of data are used to establish a baseline (nominal) state of the dynamics, on the basis of the mean (and corresponding standard deviation) of the dissimilarity measures. In another aspect, a comparison of subsequent unknown cutsets to the baseline is performed to obtain the number of standard deviations from the baseline. In another aspect, dynamical change is classified as significant if several successive occurrences of the dissimilarity measures are above a threshold. In another aspect, the analysis method is trained by adjusting the free parameters to minimize the prediction distance. In another aspect, the quality check is performed using one of proper number of data points test, intervals with unchanged amplitude test, saturation at high or low limits test, consistent amplitude across datasets test, adequate sampling rate test, excessive periodic content test, and excessive noise test.

A machine-readable data storage device storing a program of instructions executable by a machine to perform one or more methods described herein also may be provided.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A novel method and system for conversion of unstructured numeric data into structured data is presented.

Figure 1:
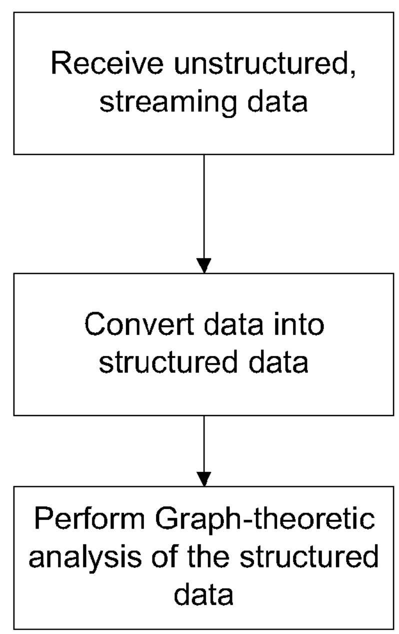
FIG. 1 is a flow diagram of the inventive method.

FIG. 1 is a flow diagram of the inventive method. In step 101 unstructured data is received. In step 102, and the received data is converted into structured data, such as a graph. In step 103, graph-theory analysis is performed on the structured data. The analysis can include determining data values that are indicative of a failure forewarning. In one embodiment, the conversion of the data into structured data can include representing, in a mathematical graph, dynamical states as nodes and dynamical transitions as links. In one embodiment, the analysis can include determining change between two mathematical graphs by measuring the difference between their nodes and links, and the extent of this change can determine data values that provide a failure forewarning. For example, threshold values can be determined such that a change greater than a predetermined threshold value indicates a failure forewarning while a change less than the predetermined threshold value does not forewarn of failure. Values indicating forewarning of failure can range, and can be chosen in accordance with the event being detected. Typical values of the threshold for the best prediction distance to date (PD=0.0559) are in the range of −0.1831 to 0.3646.

These values will vary, depending on the data and the specific application.

Figure 2:
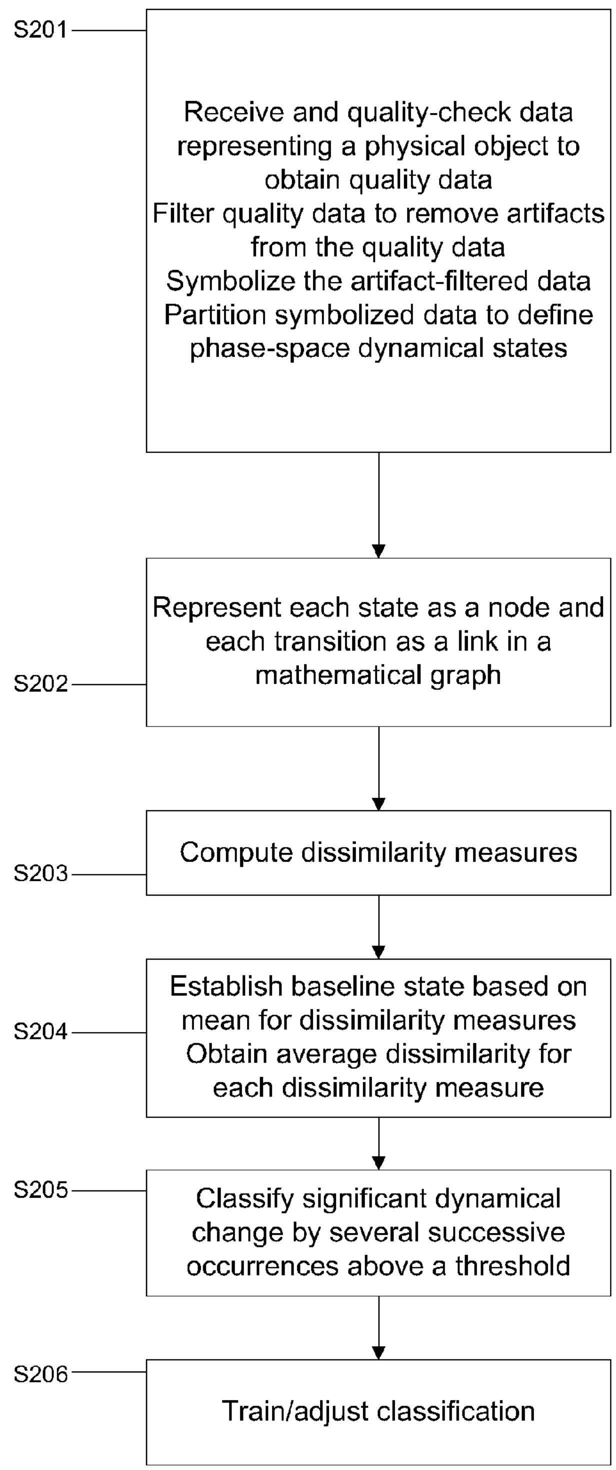
FIG. 2 is a flow diagram of an exemplary embodiment of the inventive method.

FIG. 2 illustrates the steps of an exemplary embodiment of the inventive method, steps 201 thru 206, that can be performed on a preprogrammed computer apparatus. These method steps, which are described in more detail below, are: step 201, data quality check of the data, removal of artifacts from the data, symbolization of the artifact-filtered data, and phase-space reconstruction via time-delay embedding; step 202, representation of the process flow using nodes and links; step 203, compute dissimilarity measures; step 204, establish baseline based on mean of dissimilarity measures and obtain average dissimilarity for each dissimilarity measure, step 205, classify significant dynamical change by several successive occurrences above a threshold; and step 206, train and/or adjust the classification.

In step 201 of the novel method, a process-indicative signal, e, is sampled at equal time intervals, $\tau$, starting at an initial time, $t_0$, yielding a time-serial set of N points, e.g., cutset, $e_i=e(t_0+i\tau)$. Typically N is a very large number, on the order of $10^4$ or greater. The garbage-in-garbage-out syndrome is avoided by performing quality control tests and rejecting inappropriate or "garbage" data from the sampled data of the process-indicative signal. Any of the following tests can be used for quality control: proper number of data points; intervals with unchanged amplitude; saturation at high or low limits; consistent amplitude across datasets; adequate sampling rate; excessive periodic content; and excessive noise. Data that fails a quality control test can be rejected; data that does not fail can be considered quality data.

Further, artifacts are removed using a filter. In one embodiment, a zero-phase quadratic filter can be used; such filters typically perform better than conventional filters. The quadratic filter fits a parabola in the least-squares sense over a moving window of 2w+1 data points. The central point of the fit estimates the low-frequency artifact, $f_i$. The residual (artifact-filtered) signal, $g_i=e_i-f_i$, has essentially no low-frequency artifact activity.

Further, the $g_i$-data are symbolized into S discrete values, $s_i$, namely $0 \le s_i \le S-1$. In one example, equiprobable symbols are formed by ordering all of the baseline data from the smallest to largest value. The first N/S of these ordered values correspond to the first symbol, 0; data values (N/S)+1 through 2N/S correspond to the second symbol, 1, etc. Another example is uniform symbols, $s_i=\mathrm{INT}[S\ (g_i-g_n)1(g_x-g_n)]$, where $g_x$ and $g_n$ are the maximum and minimum in the $g_i$-data, respectively. In this example, the variable, UE, is used to designate the uniform (UE=0) or equiprobable (UE=1) symbols.

Further, the dynamical domain is partitioned into bins. In one embodiment, a time-delay vector, $y(i)=[s_i, s_{i+L}, \ldots, s_{i+(d-1)L}]$, uniquely defines a phase-space state, thus partitioning the dynamical domain into $S^d$ bins. Several channels of data add more information for: $y(i)=[s_i(1), s_{i+L}(1), \ldots, s_{i+(d-1)L}(1), \ldots, s_i(C), s_{i+L}(C), \ldots, s_{i+(d-1)L}(C)]$. Here, s(k) denotes symbols from the k-th channel up to C channels with a total of $S^{Cd}$ dynamical states. Here, L is the time delay, and d is the dimension of the time-delay space on the basis of Takens' theorem (also called the time-delay-embedding theorem).

In step 202, each dynamical state, y(i), is represented as a node, and each state-to-state-dynamical transition, $y(i) \rightarrow y(i+M)$, is represented as a link in a mathematical graph. Takens' theorem provides a diffeomorphism that guarantees topology (connectivity) and directivity, but not a density of states. Graph theorems guarantee topologically-invariant measures of these graphs, namely measures that do not depend on the labeling of the nodes or links, but only on the graph topology.

In step 203, four dissimilarity measures are computed between graphs from different cutsets, namely as $V_i$=(nodes in A but not in B)/(nodes in A), $V_2$=(nodes in B but not in A)/(nodes in B), $V_3$=(links in A but not in B)/(links in A), and $V_4$=(links in B but not in A)/(links in B).

Step 204 uses several initial cutsets of data to establish a baseline (nominal) state for the dynamics. Specifically, the mean for each dissimilarity measure, $\bar{V}$, is obtained by comparison among the B(B−1)/2 unique combinations of the B base case segments, with a corresponding sample standard deviation, $\sigma$.

In addition, each contiguous, non-overlapping test case is compared to each of the B base case intervals to obtain the corresponding average dissimilarity, $V_i$ of the i-th analysis window for each dissimilarity measure. $U_i$ is the number of standard deviations that the i-th test case (unknown dynamics) deviates from the base case (nominal-state), $U_i(V)=|V_i-\bar{V}|/\sigma$.

In step 205, significant dynamical change is classified by several successive occurrences ($N_{OCC}$) of $U_i$ above a threshold ($U_C$). The determination of the threshold and the number of successive occurrences usually requires an exhaustive (numerical) search. In the present embodiment, the normalized measures, $U_i(V)$, themselves are the values over which to search for the threshold. To perform the search in the present embodiment, sort all of the $U_i(V)$ values from the smallest to largest value, discard duplicate values, and search over those unique values for the threshold for all possible number of successive occurrences above that threshold. The threshold for each dissimilarity measure is then unique to that measure.

In step 206, training analysis is performed by adjusting the free parameters to minimize the prediction distance. The measures of success are the number of true positives (TP) from known-event datasets (Ev), and the number of true negatives (TN) from known-non-event datasets (NEv). Best TP and TN rates are obtained by minimizing the prediction distance:

$$D=\{[1-(TP/Ev)]^2+[1-(TN/NEv)]^2\}^{1/2}. \quad (1)$$

The training analysis proceeds as follows: (a) choose specific values for each of the training parameters in the set, {d, S, M, L, w, B, N}; (b) search exhaustively over $N_{OCC}$ (the number of successive cutsets where dissimilarity between test and base cases is above a threshold) and $U_C$ (the threshold for a normalized dissimilarity measure) for each of the dissimilarity measures to find the smallest prediction distance, D, or for smallest forewarning time if no improvement in D occurs; (c) search randomly over the parameter space in (a)-(b) until no further improvement is found; and (d) search exhaustively over the pruned domain from (c) to find the largest region of smallest D. The search strategies under (c) and (d) use the falsifiability theorem to eliminate (prune) statistical models that do not match the data.

Threshold values, for indication of forewarning, have a range as part of the statistical training of the classifier. Indeed, all of the training parameters have a range, which must be chosen for event forewarning or event detection, depending on the data and the application of the data.

This disclosure teaches an improvement that extends the discrete phase-space-state reconstruction via graph-theoretic analysis to detect condition change in numeric data. The use of an unweighted, directed graph from the time-delay-embedding theorem, graph-invariant measures as guaranteed by graph theorems, and pruning of the training parameters via statistical falsifiability are key features of the present disclosure.

This time-delay-embedding approach assumes that the underlying observable, e, is (a) twice-differentiable, (b) real function that (c) captures typical dynamics (d) without special symmetries. Under these assumptions, Takens' theorem guarantees reconstruction of system properties from the observable, e.g., the topology of the dynamics. However, Takens' theorem does not specify how to reconstruct the system dynamics.

More specifically, the eigenvalues of the graph Laplacian matrix can be computed. These eigenvalues are independent of the state label, and thus are herein called "graph invariant." That is, different representations of the same graph have the same eigenspectrum. The smallest eigenvalue of the graph Laplacian is zero. The second smallest eigenvalue is called the algebraic connectivity, and has an associated eigenvector, called the Fiedler vector. Multi-level (graph coarsening) techniques allow computation of the Fiedler vector, x. The corresponding eigenvalue (algebraic connectivity) can then be computed from the Rayleigh quotient, $x^TAx/(x^Tx)$, where A is the adjacency matrix. One or more of these eigenvalues can be used as features to detect (classify) condition change from numeric data representing physical objects, such as brain waves, tri-axial acceleration, etc. For example, brain waves can be used to forewarn of an epileptic seizure, tri-axial acceleration to forewarn of a machine or structural failure.

One normally skilled in the art can appreciate that the scope of this disclosure includes many other graph-invariant measures that can be used to provide "provable properties" of the graph, e.g., number of graph nodes, number of graph links, number of cycles in the graph. Such graph-theoretic measures can also be used to quantify the information that is represented in the graph.

The graph-theoretic analysis of the preceding method steps allows conversion of unstructured numeric data (a stream of time-serial numeric data) into structured data (a graph), for which many additional methods exist. However, the present inventive approach enables an advancement of knowledge discovery via automated learning. Namely, the described analysis of the preceding method to numeric data can be combined with the use of discrete states in text (e.g., words) and image (e.g., image segments) data for graph-theoretic analysis. The human brain may use this approach to create abstractions of disparate data (discrete states in images, text, numeric data).

Additional specific applications include electrical hysteresis energy in the charge/discharge cycle of a battery to forewarn of failure, Scalp EEG to forewarn of epileptic seizures, Scalp EEG for diagnosis of Alzheimer's disease and traumatic brain injury.

A computer apparatus is used to execute a series of preprogrammed commands that perform the method steps described herein. The computer may be a mainframe, a super computer, a PC or Apple Mac personal computer, a hand-held device, a smart phone, embedded chip, or other computing apparatus known in the art. The computer is programmed with a series of instructions that, when executed, cause the computer to perform the method steps as described and claimed in this application. The instructions are stored on a machine-readable non-transitory data storage device. Non-transitory machine-readable medium is intended to refer to all medium capable of storing information in a manner readable by a machine, exclusive only of transitory signals. However, regarding transitory signals relayed from intermediate devices, such as internet-connected servers on which the data contained within the transitory signal is necessarily stored, for a time, within buffers, memory or other storage devices, the intermediate devices are understood to constitute non-transitory machine-readable storage medium as well.

The machine-readable non-transitory data storage device can be a portable memory device that is readable by the computer apparatus. Such portable memory device can be a compact disk (CD), digital video disk (DVD), a USB Flash Drive, any other disk readable by a disk driver embedded or externally connected to a computer, or any other portable storage medium currently available or yet to be invented. Alternately, the machine-readable non-transitory data storage device can be an embedded component of a computer such as a hard drive or a flash drive of a computer.

The computer and machine-readable non-transitory data storage device can be a standalone device or a device that is imbedded into a machine or system, such as a monitoring system, that uses the instructions for a useful result.

The foregoing descriptions of various examples of the present disclosure have been presented for purposes of illustration only. The described examples are not intended to be exhaustive or to limit the scope of the disclosure to the precise form(s) disclosed. Obvious modifications or variations are possible in light of the above teachings. The examples are chosen and described in an effort to provide the best illustrations of the principles of the disclosure and its practical application, and to thereby enable one of ordinary skill in the art to utilize the concepts revealed in the disclosure in various examples and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A machine-readable non-transitory data storage device having a series of preprogrammed code which, when loaded on a computer apparatus, causes the computing apparatus to:

receive a stream of time-serial numeric data representing a physical object;

convert the data to structured data; and analyze the structured network with graph-theoretic analysis to detect condition change in the time-serial numerical data and to quantify changes among phase-space dynamical states of the structured data, wherein the analysis of the structured network comprises:

partitioning the received data to define the plurality of phase-space dynamical states, for each phase-space dynamical state, each state represented as a node in a mathematical graph and each state-to-state transition represented as a link in the mathematical graph;

computing the dissimilarity measures between the mathematical graphs of the phase-space dynamical states;

establishing, using the phase-state dynamical states, a baseline state and obtaining average dissimilarity between each contiguous phase-space dynamical state and the baseline state;

classifying dynamical change based on a plurality of successive occurrences of phase-space dynamical states above a threshold; and training the classification of dynamical change to minimize prediction distance.

2. The device of claim 1, wherein the conversion of the data to structured data comprises:

performing quality check of the received data to obtain quality data;

filtering the quality data to remove artifacts from the quality data;

symbolizing the artifact-filtered data; and partitioning the received data to define the plurality of phase-space dynamical states, for each phase-space dynamical state, each state represented as a node in a mathematical graph and each state-state transition represented as a link in the mathematical graph.

3. The device of claim 1, wherein the training comprises:

choosing specific values for training parameters;

determining a smallest prediction distance by searching exhaustively over the successive phase-space dynamical states where the dissimilarity between the phase-space dynamical state and the baseline state is above a threshold; and minimizing the prediction distance.

4. A machine-readable non-transitory data storage device having a series of preprogrammed code which, when loaded on a computer apparatus, causes the computing apparatus to:

receive a stream of time-serial numeric data representing a physical object and perform quality check of the received data to obtain quality data;

filter the quality data to remove artifacts from the quality data;

symbolize the artifact-filtered data;

partition the symbolized artifact-filtered data to define a plurality of phase-space dynamical states, for each phase-space dynamical state, each state represented as a node in a mathematical graph and each state-to-state transition represented as a link in the mathematical graph of the phase-space dynamical state;

compute the dissimilarity measures between the mathematical graphs of the phase-space dynamical states;

establish, using the phase-space dynamical states, a baseline state; and analyze the network with graph-theoretic analysis to detect condition change in the time-serial numerical data and to quantify changes among the phase-space dynamical states, the analysis comprising computing a Laplacian matrix of the network, computing a plurality of eigenvalues of the Laplacian matrix and using the plurality of eigenvalues to detect condition change.

5. The device of claim 4, wherein the condition change is detected when one or more of the eigenvalues is above a predetermined threshold.

6. The device of claim 4, wherein the quality check is performed using one of proper number of data points test, intervals with unchanged amplitude test, saturation at high or low limits test, consistent amplitude across datasets test, adequate sampling rate test, excessive periodic content test, and excessive noise test.

7. The device of claim 4, wherein the dissimilarity measures are based on summing the absolute value of differences between pairs of phase-space dynamical states.

8. A method for condition change detection, comprising:

receiving a stream of time-serial numeric data representing a physical object;

converting the data to structured data; and analyzing the structured network with graph-theoretic analysis to detect condition change in the time-serial numerical data and to quantify changes among phase-space dynamical states of the structured data, wherein the analysis of the structured network comprises:

partitioning the received data to define the plurality of phase-space dynamical states, for each phase-space dynamical state, each state represented as a node in a mathematical graph and each state-to-state transition represented as a link in the mathematical graph;

computing the dissimilarity measures between the mathematical graphs of the phase-space dynamical states;

establishing, using the phase-state dynamical states, a baseline state;

obtaining average dissimilarity between each contiguous phase-space dynamical state and the baseline state;

classifying dynamical change based on a plurality of successive occurrences of phase-space dynamical states above a threshold; and training the classification of dynamical change to minimize prediction distance.

9. The method of claim 8, further comprising:

performing quality check of the received data to obtain quality data;

filtering the quality data to remove artifacts from the quality data;

symbolizing the artifact-filtered data; and partitioning the received data to define the plurality of phase-space dynamical states, for each phase-space dynamical state, each state represented as a node in a mathematical graph and each state-to-state transition represented as a link in the mathematical graph.

10. The method of claim 8, wherein the training comprises:

choosing specific values for training parameters;

determining a smallest prediction distance by searching exhaustively over the successive phase-space dynamical states where the dissimilarity between the phase-space dynamical state and the baseline state is above a threshold; and minimizing the prediction distance.

11. A method for condition change detection comprising:

receiving a stream of time-serial numeric data representing a physical object and performing quality check of the received data to obtain quality data;

filtering the quality data to remove artifacts from the quality data;

symbolizing the artifact-filtered data;

partitioning the symbolized artifact-filtered data to define a plurality of phase-space dynamical states, for each phase-space dynamical state, each state represented as a node in a mathematical graph and each state-to-state transition represented as a link in the mathematical graph of the phase-space dynamical state;

computing the dissimilarity measures between the mathematical graphs of the phase-space dynamical states;

establishing, using the phase-space dynamical states, a baseline state; and analyzing the network with graph-theoretic analysis to detect condition change in the time-serial numerical data and to quantify changes among the phase-space dynamical states, the analyzing comprising computing a Laplacian matrix of the network, computing eigenvalues of the Laplacian matrix and using the eigenvalues to detect condition change.

12. The method of claim 11, wherein the quality check is performed using one of proper number of data points test, intervals with unchanged amplitude test, saturation at high or low limits test, consistent amplitude across datasets test, adequate sampling rate test, excessive periodic content test, and excessive noise test.

13. The method of claim 11, wherein the dissimilarity measures are based on summing the absolute value of differences between pairs of phase-space dynamical states.

* * * * *